(12) United States Patent
Scharf et al.

(10) Patent No.: US 10,203,012 B2
(45) Date of Patent: Feb. 12, 2019

(54) UNIT MOUNT, IN PARTICULAR FOR A MOTOR VEHICLE

(71) Applicant: BOGE ELASTMETALL GMBH, Damme (DE)

(72) Inventors: Joerg Scharf, Eppenrod (DE); Maren Jacke, Wolfsburg (DE); Jens Martin, Wahrenholz (DE)

(73) Assignee: BOGE ELASTMETALL GMBH, Damme (DE)

( * ) Notice: Subject to any disclaimer, the term of this patent is extended or adjusted under 35 U.S.C. 154(b) by 0 days.

(21) Appl. No.: 15/503,141

(22) PCT Filed: Aug. 10, 2015

(86) PCT No.: PCT/EP2015/068351
§ 371 (c)(1),
(2) Date: Feb. 10, 2017

(87) PCT Pub. No.: WO2016/023859
PCT Pub. Date: Feb. 18, 2016

(65) Prior Publication Data
US 2017/0299007 A1  Oct. 19, 2017

(30) Foreign Application Priority Data
Aug. 13, 2014 (DE) .................. 10 2014 216 070

(51) Int. Cl.
*F16F 1/38* (2006.01)
*F16M 13/02* (2006.01)
*B60K 5/12* (2006.01)

(52) U.S. Cl.
CPC .............. *F16F 1/38* (2013.01); *F16F 1/3849* (2013.01); *F16M 13/02* (2013.01); *B60K 5/1208* (2013.01)

(58) Field of Classification Search
CPC .......... F16F 1/38; F16F 1/3849; F16M 13/02; B60K 5/1208
See application file for complete search history.

(56) References Cited

U.S. PATENT DOCUMENTS

| 3,037,764 A * | 6/1962 | Paulsen | F16F 1/422 267/141 |
| 5,123,625 A * | 6/1992 | Spaltofski | F16F 1/376 248/634 |
| 6,450,474 B1 * | 9/2002 | Bucksbee | B60K 5/1208 248/560 |

FOREIGN PATENT DOCUMENTS

| DE | 3724432 A1 | 2/1989 |
| DE | 102006050070 A1 | 5/2008 |

(Continued)

OTHER PUBLICATIONS

International Search Report of PCT/EP2015/068351, dated Dec. 18, 2015.

(Continued)

*Primary Examiner* — Vishal R Sahni
(74) *Attorney, Agent, or Firm* — Cohen & Hildebrand, PLLC

(57) ABSTRACT

A unit mount (1) for a motor vehicle is provided. The unit mount (1) includes a closed, one piece housing (7) with a housing opening (15, 33) on each of two sides that lie opposite each other; an elastomeric bearing spring (5) that is accommodated in the housing (7), and a support arm (3) that is secured within the housing (7) with at least one end protruding from one of the two housing openings (15, 33). For providing a cost-effective unit mount (1) with a simplified assembly, the elastomeric bearing spring (50) is inserted after the support arm (3) has been mounted.

16 Claims, 5 Drawing Sheets

(56) References Cited

FOREIGN PATENT DOCUMENTS

| | | |
|---|---|---|
| DE | 102007044382 A1 | 3/2009 |
| DE | 102010043165 A1 | 5/2012 |
| DE | 102011011298 A1 | 8/2012 |
| DE | 102012106064 A1 | 2/2014 |
| DE | 102012110480 A1 | 5/2014 |

OTHER PUBLICATIONS

German Search Report of DE 10 2014 216 070.7, dated Jan. 28, 2015.

\* cited by examiner

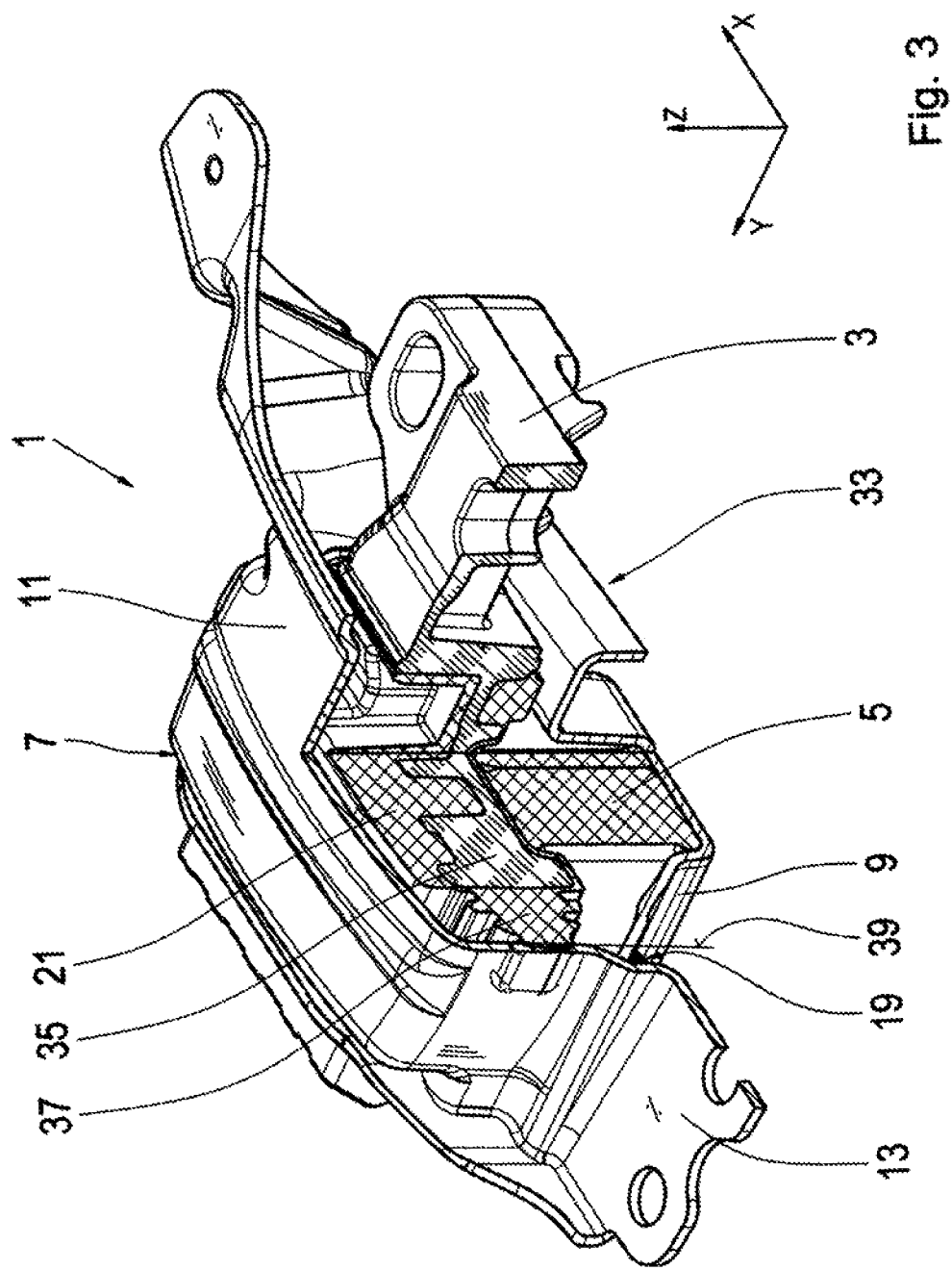

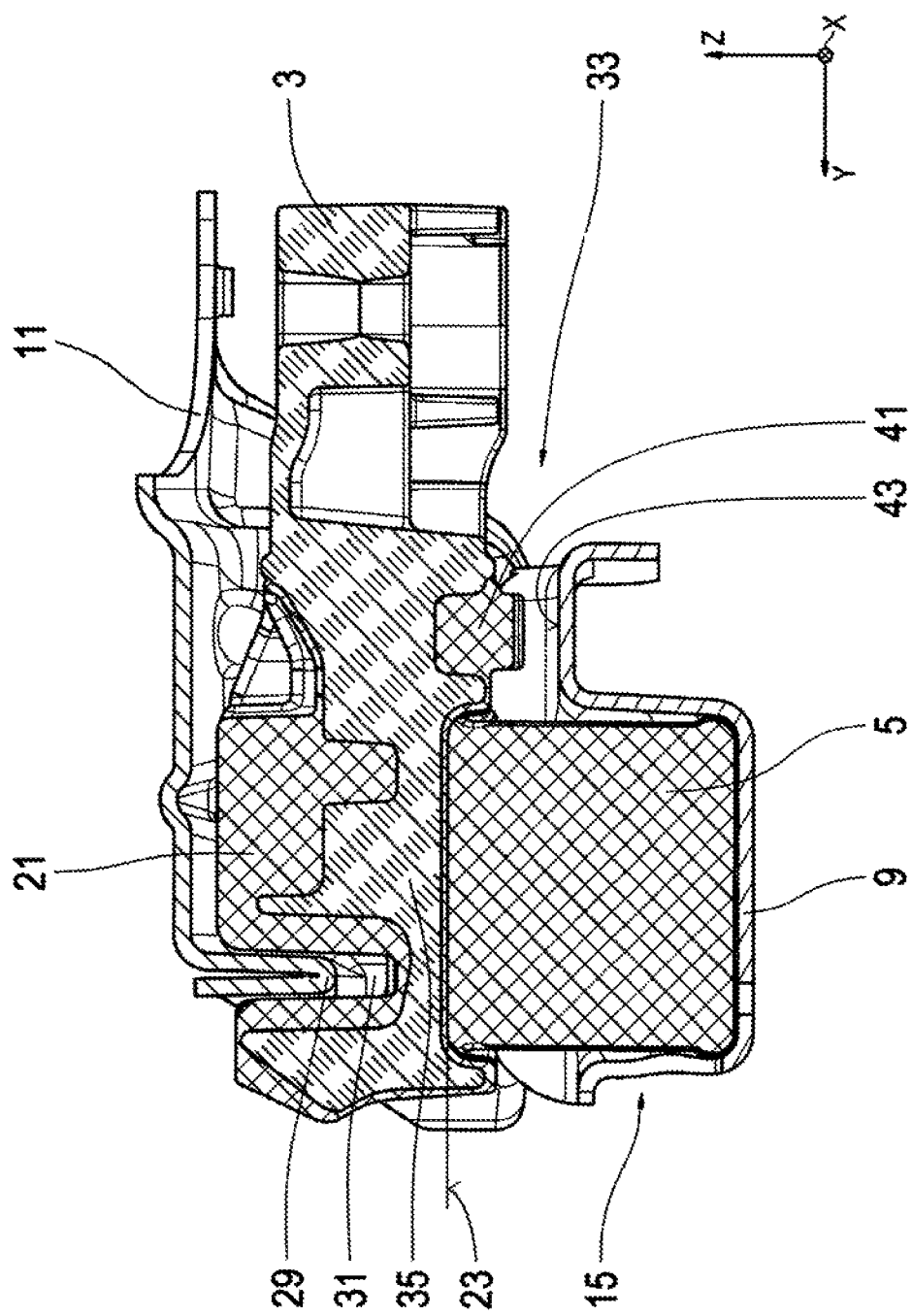

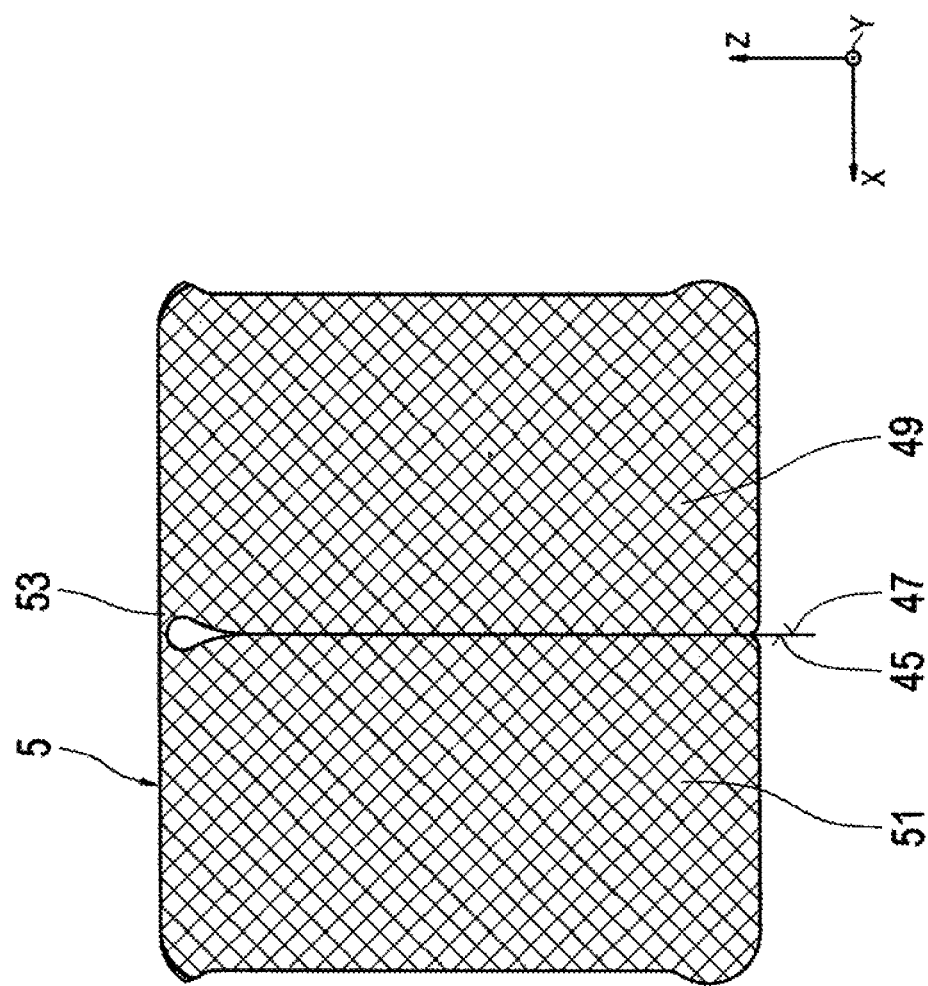

UNIT MOUNT, IN PARTICULAR FOR A MOTOR VEHICLE

This is an application filed under 35 USC § 371 of PCT/EP2015/068351, filed on Aug. 10, 2015 claiming priority to DE 10 2014 216 070.7, filed on Aug. 13, 2014, each of which is herein incorporated by reference in its entirety.

BACKGROUND OF THE INVENTION

The invention relates to a unit mount, in particular for a motor vehicle, and to a method for mounting such a unit mount according to the independent claims.

Many different configurations of unit mounts for motor vehicles are known. By way of unit mounts, components such as, for example, an internal combustion engine, a gear selector transmission or a motor-transmission unit can be connected to a vehicle body or to an axle carrier, which is also referred to as a subframe, in a vibration-damping manner. For this purpose, such unit mounts have a support arm which is rigidly attached to the unit to be damped and engages in a housing which is rigidly connected to the vehicle body and which surrounds the end of the support arm facing away from the unit. This end section of the support arm arranged in the housing and the housing itself do not touch directly, but are separated from each other by a vibration-damping elastomeric material that is arranged between the two components. The elastomeric material, in conjunction with corresponding stop faces disposed on the inner sides of the housing, not only dampens vibrations, but also limits movement amplitudes of the unit to be damped. For the vibration-damping absorption of the vertically acting weighting force of the unit, which is introduced into the housing via the support arm, unit mounts have frequently an elastomeric support spring arranged inside the housing in addition to the abovementioned elastomeric material, which is essentially designed as a cube or as a cuboid and supports the end section of the support arm disposed inside the housing. The support arm usually extends in a transverse direction of the vehicle. In a motor vehicle, unit mounts are frequently arranged in pairs as a support unit, wherein a first of the two unit mounts is designed as a so-called fixed bearing and the other unit mount is designed as a so-called floating bearing. The housing of such a fixed bearing provides stop faces for the end section of the support arm arranged in the housing in the transverse direction of the vehicle, a vertical direction of the vehicle, and a longitudinal direction of the vehicle having a positive orientation that generally corresponds to a direction of travel. In order to be able to accommodate a thermal expansion of the unit to be damped, a second bearing of such a bearing unit is often designed as a floating bearing, which essentially constructed similar to the fixed bearing. However, unlike the abovementioned fixed bearing, the floating bearing permits movements in one of the previously mentioned three directions. This is generally the transverse direction of the vehicle, whereby movements in this direction can take place both in a positive as well as in a negative orientation.

DE 10 2010 043 165 A1 discloses a unit mount designed as a fixed bearing with a one-piece, but not an integral, sheet metal housing, wherein the sheet metal housing consists of two housing parts which are joined by welding or soldering. The two housing parts are joined to form a one-piece sheet metal housing before the elastomeric support spring is inserted and the support arm is mounted. The sheet metal housing has, in three mutually orthogonal directions, in each case pairwise bump stops formed as stop faces in order to limit the movement of the support arm relative to the sheet metal housing when the load is subjected to vibrations, with the limitation being provided for movements having both a positive orientation and a negative orientation with respect to the respective extension direction. The sheet metal housing also has a sword-shaped tongue, which is formed by an edge of a wall section of the sheet metal housing protruding into the interior of the sheet metal housing. The movement is limited in one of the extension directions in that the tongue engages in a groove of the support arm coated with elastomer material and thus constitutes a wall-like boundary in the form of a stop face. For assembling the unit mount, the elastomeric support spring is first inserted into the housing and the support arm is thereafter mounted. For this purpose, an end section of the support arm having the aforementioned groove is forced into the sheet metal housing around the tongue. A resistance must hereby be overcome which results from the compression of the elastomeric support spring when the support arm is forced in.

It is an object of the invention to provide a cost-effective and, at the same time, lighter unit mount which is easier to assemble and saves material.

BRIEF SUMMARY OF THE INVENTION

This object is attained according to the present invention by a mount of the generic type which additionally has the characterizing features of claim 1. Claim 13 discloses a method for producing such a unit mount.

Preferred embodiments and further developments are the subject matter of the dependent claims.

The invention thus provides a unit mount, in particular a unit mount for a motor vehicle. The unit mount includes a closed, one-piece housing with respective housing openings disposed on two opposite sides, an elastomeric support spring which can be accommodated in the housing, and a support arm which can be fixed inside the housing and which projects at least with one end from one of the two housing openings. The invention proposes that the elastomeric support spring can be used after a support arm is already mounted. The unit mount can be designed as a motor mount for vibration-damping support of a drive motor, for example a combustion engine, as a transmission mount for vibration-damping support of a gear selector transmission or as a mount for a motor-gear unit.

A closed housing in the context of the present invention is understood here to be a housing which contiguously surrounds without interruption the elastomeric support spring and an end section of the support arm arranged inside the housing at least in one plane, as opposed to housings known from the prior art, which have, for example, a bow shape or an Ω-shape. A one-piece housing is to be understood as a housing that is formed as one piece during the assembly of the unit mount, i.e. when the support arm is mounted and the elastomeric support spring is subsequently inserted in the housing. The housing formed in one piece at the time of assembly may be formed from several individual housing parts which were connected to one another before the unit mount is assembled. In this case, the connection is preferably designed as a material connection, in particular as a weld or solder joint. From the design principle, the housing may be implemented as a sheet metal design or as a cast design or as a section of an extruded profile. The housing may have fastening lugs for attaching the unit mount to a vehicle body, for example on a longitudinal beam of a vehicle body, or to an axle carrier, which is also referred to as a subframe. When the housing is constructed from sheet-metal, the fastening lugs are preferably single-layered for reducing weight, i.e., have the thickness of a single sheet.

The support arm, which is also referred to as a bracket, can be formed from steel, aluminum or cast aluminum or from plastic, in particular from fiber-reinforced injection-molded plastic with inserted or externally applied reinforcement in form of organic plastic sheets. The end section of the support arm arranged inside the housing is covered completely or only in some areas with an elastomeric material. The elastomeric material forms stop buffers which, in conjunction with corresponding stop faces on the inner side of the housing, represent paired excursion limits formed as stop faces, in three mutually orthogonal extension directions having both positive and negative orientation, in order to reduce the relative movement of the support arm relative to the housing. Because travel is limited in three mutually orthogonal directions, the unit mount is a fixed bearing. The three mutually orthogonal directions are a longitudinal direction of the vehicle, a transverse direction of the vehicle and a vertical direction of the vehicle.

The end section of the support arm, which faces the end section of the support arm arranged inside the housing, is connected to the unit to be damped, for example the internal combustion engine. The connection is, in particular, a rigid connection, preferably a screw connection.

The housing has a sword-shaped tongue which extends into the interior of the housing and which engages in a correspondingly shaped groove of the support arm in order to prevent the support arm from slipping out of one of the housing openings, in particular slipping out in the transverse direction of the vehicle. By way of the above-described arrangement, the support arm is positively secured inside the housing. The support arm is secured directly by the geometric design of the housing. Additional fasteners are not required.

The elastomeric support spring and the elastomeric material which surrounds the end section of the support arm arranged inside the housing either completely or in a region, bear against each other inside the housing so as to form a common contact surface. There is no material connection between the elastomeric support spring and the elastomeric material. Materials having identical or different composition and properties can be used for the elastomeric support spring, with the elastomeric material depending on the requirements for the unit mount.

In addition to an embodiment with an end section of the support arm arranged inside the housing, the unit support may also have a continuous support arm which protrudes from both housing openings and has a partial section arranged inside the housing which is completely or partially covered with the elastomeric material. In this embodiment, the housing again has a sword-shaped tongue which extends into the interior of the housing and which engages in a shape-matching groove of the part section of the support arm arranged inside the housing in order to fix the support arm in its position. A support arm designed in this way has preferably bores at both ends, which can be used to attach the support arm to the unit to be damped with fastening screws.

The inside of the housing forms with the elastomeric support spring a common trough-shaped contact surface. As a result, the elastomeric support spring is positively secured within the housing and thus secured against falling out.

Advantageously, with the support arm already installed, the elastomeric support spring can be inserted into the housing by way of a first of the two housing openings, with the support arm protruding from the first housing opening not at all or only slightly.

This arrangement simplifies assembly of the unit mount compared to the prior art, because the end section of the support arm having the groove does, not have to be forced into the housing around the blade-shaped tongue against the resistance of the compressed elastomeric support spring. To make this possible, the first housing opening is designed in such a way that the elastomeric carrier spring can be inserted into the housing through this first housing opening with the support arm already installed. This can reduce the forces required for the assembly of the unit mount. In addition, a simpler and thus more cost-effective mounting device for the assembly can be designed, because the design complexity caused by the forced insertion of the support arm, also referred to as threading, is eliminated. The first housing opening is enlarged compared to the prior art, which makes it easier to discern identification marks in form of engravings applied to the elastomeric support spring. The first housing opening, which is enlarged compared to the prior art, also reduces the volume of trough-shaped, scooping geometric regions within the housing. Scooping geometric regions are to be understood as cavities or contours in which liquid, in particular water, can collect when the motor vehicle is positioned substantially horizontally. Frequently splashing water accumulates in these scooping geometric regions, for example when the unit mount is designed as an engine bearing or transmission bearing mounted at a relatively short distance from a roadway. Water from flooded roads or puddles can also collect in the scooping geometric regions while driving. Moreover, water can also collect in the scooping geometric regions of the unit mounts that are mounted at elevated installation locations in the motor vehicle when cleaning the engine.

When water accumulated in the scooping geometric regions freezes, this often leads to a significantly worsened damping and acoustic behavior of the unit mount, which moreover can also be damaged or even rendered unusable by freezing of the water and the associated expansion.

The elastomeric support spring preferably has a prestress in the assembled state.

The prestress is realized by the fact that an installation space available for the elastomeric support spring in the assembled state, i.e. when the unit mount is fully assembled, is smaller than the corresponding volume of the elastomeric support spring in the relaxed state. This prestress ensures that the unit mount has the required damping properties after installation in the motor vehicle and when subjected to the weight force of the unit to be dampened, which then acts on the individual components of the unit mount. After the unit mount is assembled, but before the unit mount is installed in the motor vehicle, the prestress prevents contact between the housing and the support arm during transport and possibly ensuing surface damage to the components. In addition, the prestress prevents the individual components of the unit mount from being separated during transport. The prestress obviates the need for additional connecting elements such as rivets or screws for maintaining the position of the end section of the support arm arranged inside the housing after installation.

Advantageously, the elastomeric support spring can be inserted into the housing through a second of the two housing openings, with the support arm already mounted and protruding from that housing opening.

This embodiment offers the advantage that the section of the support arm which faces the elastomeric support spring and protrudes from the second housing opening forms a guide surface and thus an insertion aid while the elastomeric support spring is being inserted.

According to a further development, the elastomeric support spring is segmented and has at least two separating surfaces.

A segmented elastomeric support spring is to be understood in the context of the present invention as an elastomeric support spring, which in contrast to a full-block spring is subdivided into a plurality of segments. The at least two separating surfaces represent in the assembled state internal surfaces and not outer surfaces of the elastomeric support spring and are designed to have matching shapes. In the assembled state, the at least two separating surfaces abut one another without a gap essentially over their entire surface. Each two separating surfaces form a corresponding separation. A segmented support spring with two segments thus has a separation with two separating surfaces, with one separating surface being assigned to each of the two segments. The segments, which advantageously have identical cross-sectional areas perpendicular to the separating surfaces, are hereby connected to one another at one of their respective ends, forming a common connecting web. At the respective opposite ends, the segments are spread apart from one another in their relaxed, non-installed state. The at least two separating surfaces can be planar or uneven. The elastomeric support spring is generally produced in an injection molding process followed by vulcanization, whereby vulcanization, also called crosslinking, refers to a chemical process which links the rubber molecule chains to one another. Vulcanization provides the elastomeric material of the elastomeric support spring with permanent rubber elasticity. Vulcanization takes place by supplying heat to the injection-molded elastomeric material of the elastomeric support spring over a certain period of time, also called heating time. A relatively long heating time is required due to a relatively poor thermal conductivity of the elastomeric material. The segmented design of the elastomeric support spring increases the surface area thereof and thus also the available surface area for heat input into the elastomeric support spring. This offers advantages for an economical manufacture compared to an elastomeric support spring designed as a full-block spring, because the heating time can be reduced due to the enlarged surface area of the elastomeric support spring.

Advantageously, the at least two separating surfaces extend in a vertical direction of the vehicle.

The connecting web can here be arranged at the top or at the bottom, as viewed in the vertical direction of the vehicle. Experiments have confirmed that an elastomeric support spring with at least two separating surfaces extending in the vertical direction of the vehicle has under load substantially the same performance as a full-block spring with the same dimensions. When a spring displacement that results when a load is applied to the elastomeric support spring as a result of a force acting in opposition to the vertical direction of the vehicle is represented by a corresponding force-displacement diagram, an elastomer is formed as a full-block spring and an elastomeric support spring with at least one separating plane have a substantially identical characteristic, also called spring characteristic. This is due to the fact that the force components of the individual segments which act perpendicularly on the separating plane when the elastomeric support spring is loaded cancel each other because they are of identical magnitude and each act in opposite directions. As a result, the design with at least two separating surfaces extending in the vertical direction of the vehicle has within the framework of the segmentation of the elastomeric support spring almost no effect on the spring characteristic, and thus on the function of the elastomeric support spring.

Advantageously, the housing opening, by way of which the elastomeric support spring can be inserted after the support arm is already installed, has a trapezoidal shape and widens in the vertical direction of the vehicle.

In this embodiment, lateral walls of a first, in relation to the vertical direction of the vehicle lower, housing section, which become wider in the vertical direction of the vehicle, act as tension struts when the upper ends, again with respect to the vertical direction of the vehicle, of the lateral walls are attached to a second housing part by a weld or solder joint. The fastening lugs for fastening the unit mount are in this case formed as a single layer by the second housing part. As a result of the aforedescribed construction and connection of the walls of the first housing part, forces from vibrating loads are safely introduced into the second housing part. With a trapezoidal design of the housing opening that widens in the vertical direction of the vehicle, there is a risk of damage, for example due to an unwanted deformation, when the first and the second housing part are not connected to one another by welding or soldering, as described above, but have instead double-layer mounting lugs for connecting the unit mount.

Alternatively, the housing opening, through which the elastomeric support spring can be inserted with the support arm previously installed, is designed in the shape of a circular section with rounded transitions, which is open in the vertical direction of the vehicle. This embodiment is distinguished by a particularly favorable stress profile in the housing part accommodating the elastomeric support spring. Due to the continuous contour profile of the circular section, mechanical stresses occurring in the receiving housing part, especially in the region of the housing opening, can be kept within the material-dependent, permissible limits for vibrational loading of the unit mount. Stress peaks caused by sudden contour transitions are avoided.

Advantageously, the housing is constructed as one piece. The one-piece design of the housing offers the advantage that it is no longer necessary to join a plurality of separately produced housing parts, for example by welding or soldering. A suitable design of the housing for an implementation of the one-piece design of the housing is a sheet-metal construction. For this purpose, a metallic tube section can be used as a starting material, which is shaped in a hydroforming process into the one-piece housing in sheet-metal construction. In this context, the hydroforming process, which is also referred to as an internal high-pressure forming process, is to be understood as a non-cutting forming process, wherein the metallic tube section is shaped into a one-piece housing in a closed mold. Shaping is thereby performed by using internal pressure, which is applied on an inner surface of the wall of the tube section by way of an active medium, for example a water-oil emulsion, and which causes the wall of the tube section to contact a mold contour of the molding tool which corresponds to the outer contour of the one-piece housing. In this way, shape contours can be produced with the hydroforming process, which would otherwise only be realizable with significantly more complex production processes, such as, for example, a master mold with so-called lost molds.

According to an alternative embodiment, the housing is formed of a plurality of housing parts in a mixed construction, wherein at least one housing part is formed from the group of sheet metal stamped part, cast part or extruded part, and at least one other housing part is formed from another part type of the same group. In this context, mixed construction is meant to indicate that the housing is formed from a plurality of housing parts which are assigned to different part types, with suitable part types including sheet metal stamped parts, cast parts or extruded parts. The term "part family" is often used for "part type". The mixed construction makes it possible to select the most favorable part type for each housing part depending on the respective requirements. The individual housing parts can hereby be connected to one another by way of material joining processes, such as welding, or by way of a form-fit, for example by form-fittingly engaging contour regions. Form-fitting connections can be realized in a housing in addition to material connections.

Furthermore, a method is proposed for mounting an aforedescribed unit mount with the successive method steps listed below:

placing the support arm in the housing;
inserting the elastomeric support spring into the housing.

After insertion of the support arm into the housing, the support arm has assumed its final assembly position. The sword-shaped tongue, which is part of the housing and which extends into the interior of the housing, engages in the corresponding groove of the support arm and thus prevents displacement of the support arm, in particular displacement in the transverse direction of the vehicle.

Advantageously, in the course of the assembly of the unit mount, the support arm is first moved into its assembled position inside the housing, because the shape-matching groove of the support arm can then be positively engaged with the sword-shaped tongue of the housing without applying excessive force. As a result of the aforementioned successive process steps, the assembly of the unit mount is simplified compared to the prior art, because the support arm does not have to be forced into the housing around the blade-shaped tongue and against the resistance of the compressed elastomeric spring in order to engage the sword-shaped tongue with the shape-matching groove.

Advantageously, the support arm is inserted into the housing such that it bears against a shape-matching region of an inner wall of the housing by virtue of its own weight.

The shape-matching region of the inner wall of the housing includes in particular a stop face for limiting the movement of the support arm in an orientation of the vertical direction of the vehicle. It has proven to be advantageous to orient the housing in such a way that the blade-shaped tongue points upwards during assembly and the support arm, after being inserted into the housing, thus bears with its own weight on the shape-matching region of the inner wall of the housing. This alignment of the housing for simplifying assembly is rotated by 180° with respect to the direction of the orientation of the housing in the mounting position in the motor vehicle. Because the support arm bears against the shape-matching region of the inner wall of the housing, the greatest possible cross-section is provided for the subsequent insertion of the elastomeric support spring into the housing. Complex positioning devices can be dispensed with in a device for mounting the unit mount, since the support arm is held in this position by its own weight.

BRIEF DESCRIPTION OF THE DRAWINGS

The invention will now be described in more detail below with reference to the drawings which only show an exemplary embodiment, wherein:

FIG. 3 is a perspective view of the unit mount according to FIG. 1 from another viewing direction, also in a quarter section;

FIG. 4 is a sectional view of the mount according to FIG. 1 along the sectional plane I-I; and FIG. 5 is another sectional view of the unit mount according to FIG. 1 along the sectional plane II-II wherein only one elastomeric bearing spring of the unit mount is illustrated.

DETAILED DESCRIPTION OF THE INVENTION

Figure 1:
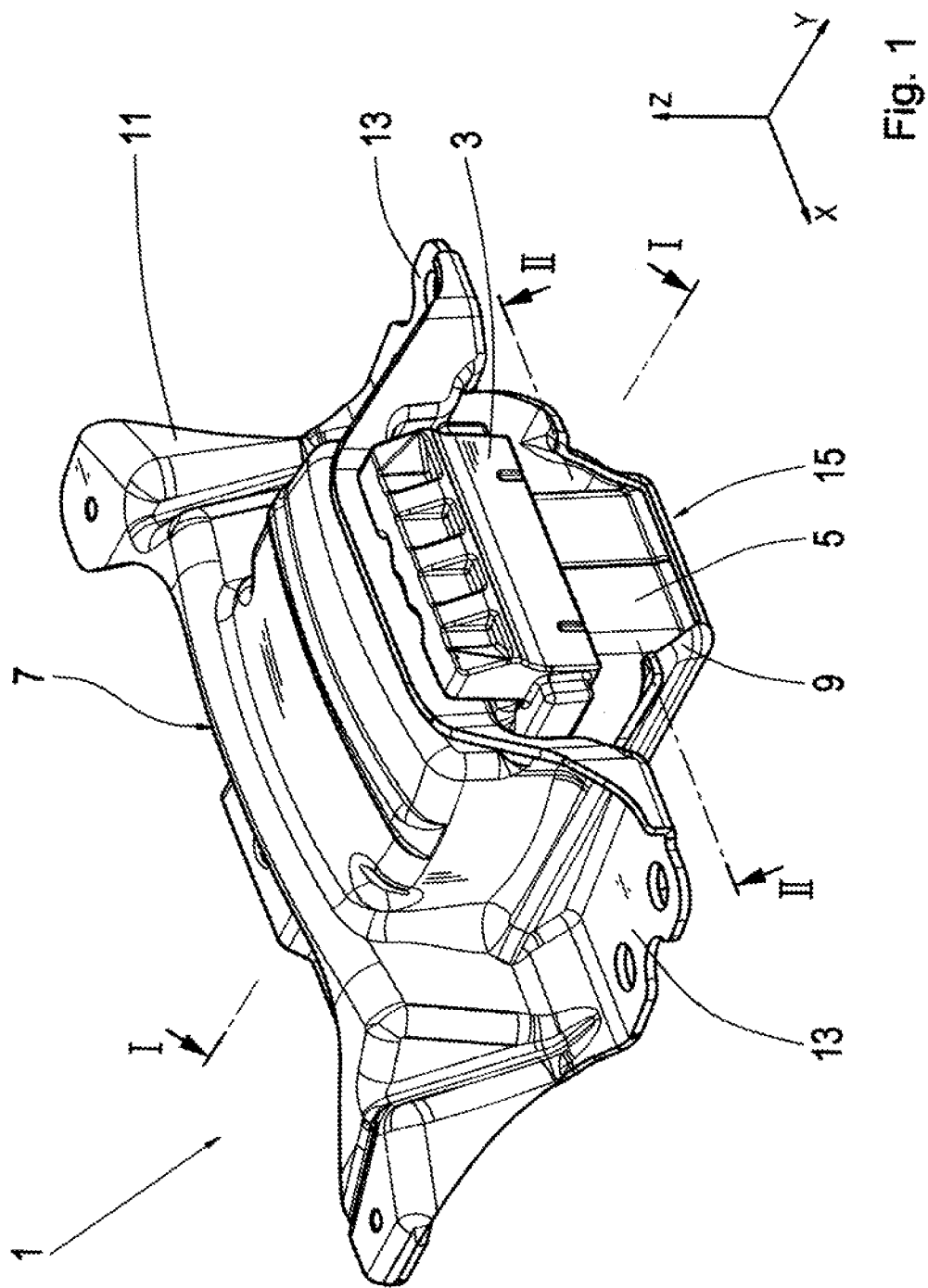
FIG. 1 is a perspective view of an embodiment of a unit mount.

FIG. 1 shows a unit mount 1 which has a support arm 3 and an elastomeric support spring 5. The support arm 3, which is connected at one end to an internal combustion engine, has a longitudinal extension in a vehicle transverse direction Y in relation to a vehicle coordinate system. The vehicle coordinate system is a three-dimensional, right-handed coordinate system that defines the position of all vehicle parts with respect to a vehicle zero point which is located in the middle of an imaginary line between the center points of both front wheels. A longitudinal direction X of the vehicle and a vertical direction Z of the vehicle extend each orthogonal to the transverse direction Y of the vehicle and orthogonal to one another. The arrows in the coordinate system shown in FIG. 1 indicate the respective positive orientation of the three abovementioned directions, with the positive orientation of the vehicle longitudinal direction X corresponding to a direction of travel. The coordinate system shown in FIG. 1 with the indicated definitions of the directions applies to all figures of the drawing.

The support arm 3 and the elastomeric support spring 5 are enclosed by a housing 7 in a plane spanned by the longitudinal direction X of the vehicle and the vertical direction Z of the vehicle. In the present embodiment, the housing 7 is formed by a first housing part 9 and a second housing part 11, wherein both housing parts 9, 11 are constructed as shaped sheet metal parts produced by a deep-drawing process. The second housing part 11 has two fastening lugs 13 for attaching the unit mount 1 to a longitudinal beam of a vehicle body.

The housing 7 of the unit mount 1 has excursion limits in a positive and a negative orientation of the three aforedescribed, mutually orthogonal vehicle directions X, Y, Z for oscillatory movements introduced by the internal combustion engine into the unit mount 1 via the support arm 3. The unit mount is therefore a so-called fixed bearing.

The elastomeric support spring 5 is arranged inside the housing 7 below the support arm 3. The housing 7 has a first housing opening 15 to enable insertion of the elastomeric support spring 5 into the housing 7 after the support arm 3 is already mounted. The first housing opening 15 provides an unobstructed passage surface 17 arranged below the support arm 3, which allows insertion of the elastomeric support spring 5 when the support arm 3 is already mounted. The passage surface 17 is somewhat smaller than the corresponding cross-sectional area of the relaxed elastomeric support spring 5, which is to be inserted into the housing 7 after passing through the passage surface 17 in the course of the assembly of the unit mount 1. Likewise, the installation space available for the elastomeric support spring 5 inside the housing 7 after the support arm 3 has been installed is smaller than the corresponding volume of the elastomeric support spring 5 in the relaxed state. In this way, the elastomeric support spring is pre-stressed in the assembled state.

Figure 2:
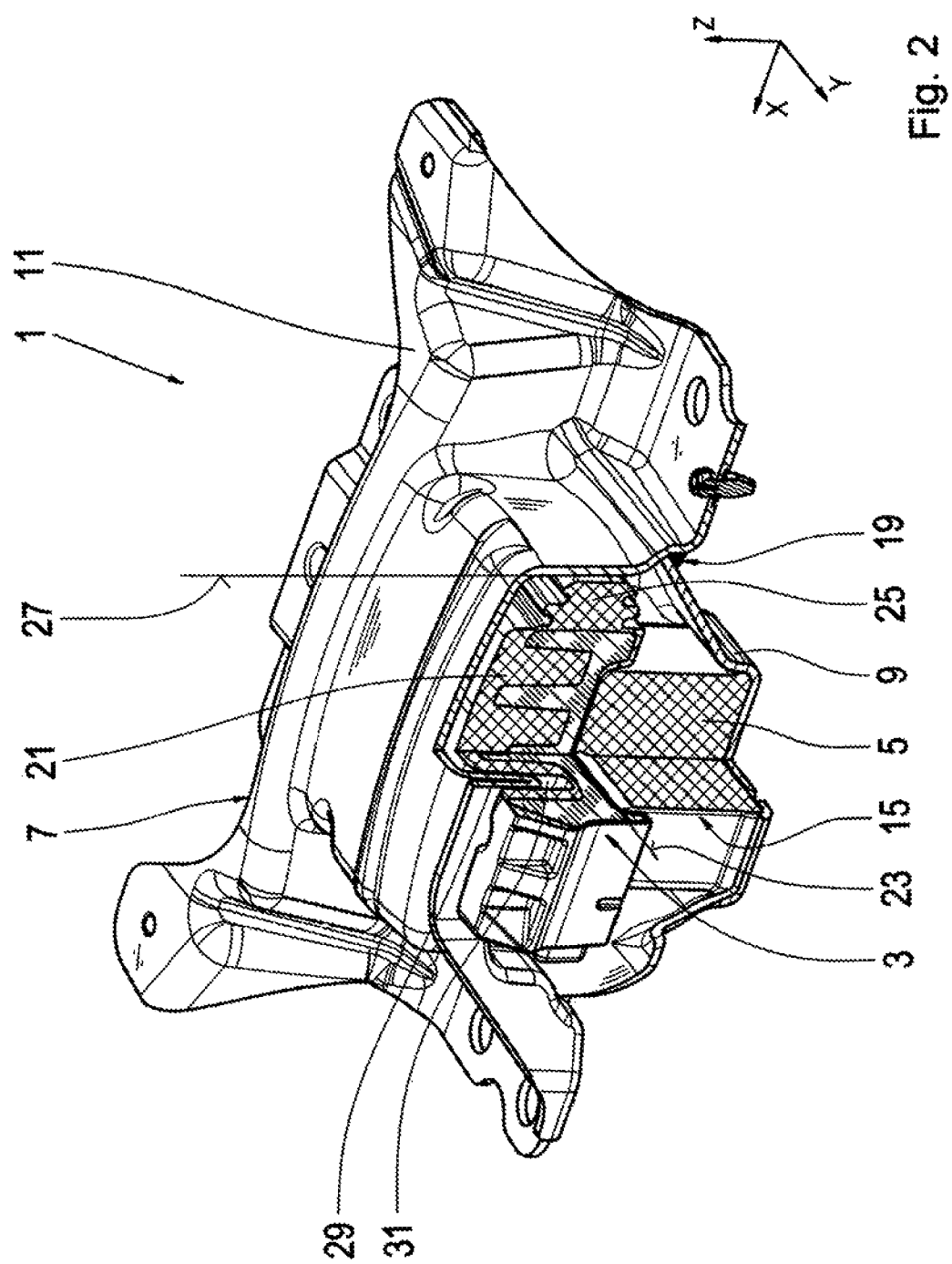
FIG. 2 is a perspective view of the unit mount according to FIG. 1 from another viewing direction and in a quarter section.

As shown in FIG. 2, the first housing part 9 and the second housing part 11 are materially connected together by a weld joint 19. The bracket 3 has a metallic core which is in sections surrounded by an elastomeric material 21.

The elastomeric support spring 5, which is inserted into the housing 7 through the first housing opening 15 when the support arm 3 is already installed, has a contact surface 23 to the elastomer material 21 which surrounds the metallic core of the support arm 3 in sections. The support arm 3 and the elastomeric suspension spring 5 are in loose contact with one another in the region of the common contact surface 23. There is no material connection in the region of this contact surface 23. The elastomeric material 21, which surrounds the metallic core of the support arm 3 in sections, and the material from which the elastomeric support spring 5 is formed, are different from each other. However, it is also conceivable to use identical materials. In the illustrated sectioned region of the unit mount 1 a first bump stop 25 is shown, which is formed from the elastomeric material 21 surrounding the metallic core of the support arm 3 in sections. The first bump stop 25 cooperates with a corresponding first stop face 27 disposed on the inside of the housing 7 facing the first bump stop 25, as a travel limit for oscillatory movements of the support arm 3 in the negative longitudinal direction X of the vehicle, i.e. in a direction opposite to the direction of travel.

The second housing part 11 has a sword-shaped tongue 29, which is formed by a folded edge and extends into the interior of the housing 7. The sword-shaped tongue 29 engages in a shape-matching groove 31 of the support arm 3 and thus acts as a travel limit in the transverse direction Y of the vehicle, both in the positive and the negative orientation.

The support arm 3 is mounted through a second housing opening 33 shown in FIG. 3, which is arranged on the side of the housing 7 opposite the first housing opening 15. After the support arm 3 is mounted, the support arm 3 is substantially arranged inside the housing 7 with an end section 35 that is fully covered by the elastomer material 21. The elastomeric support, spring 5 inserted under prestress is arranged below the support arm 3. The opposite end section of the support arm 3 which extends from the second housing opening 33 in the vehicle transverse direction Y, is rigidly connected to the unit to be damped by fastening screws. This end section of the support arm 3 has several elongated holes for receiving the fastening screws.

The first housing part 9 is connected to the second housing part 11 by the weld joint 19, which is formed as a fillet weld. Only one fastening tab 13 is visible in the perspective view of FIG. 3.

The unit mount 1 has a second bump stop 37 and a second stop face 39 arranged, mirror-symmetrically to the first bump stop 25 and the first stop face 27.

A circle with an inscribed diagonal cross indicates in the coordinate system shown in FIG. 4 that the direction of travel, i.e. the positive orientation of the longitudinal direction X of the vehicle, extends into the drawing plane.

The first housing part 9 accommodates the elastomeric support spring 5, wherein the region where the first housing part 9 and the elastomeric support spring 5 contact each other is constructed so that the elastomeric support spring 5 is at least partially encompassed by the first housing part 9. This ensures that the elastomeric support spring 5 is during the driving operation not unduly displaced from the position assumed in the assembled state position. The same applies to the contact surface 23 between the elastomeric support spring 5 and the elastomeric material 21 which surrounds the end section 35 of the support arm 3 arranged inside the housing 7.

The first housing opening 15 through which the elastomeric support spring 5 is inserted into the housing 7 while the support arm 3 is already installed is disposed on the opposite side of the housing 7 in relation to the second housing opening 33. A third bump stop 41 is formed by the elastomeric material 21 which surrounds the support arm 3 in sections. The third bump stop 41 forms by way of a third stop face 43 an excursion limit for oscillatory movements of the support arm 3 in the negative orientation of the vertical direction Z of the vehicle, i.e. toward the road surface. The third stop face 43 is disposed on the inner wall of the first housing part 9 facing the third bump stop 41.

The sword-shaped tongue 29 formed by folding an edge portion of the second housing part 11 engages in the shape-matching groove 31 of the support arm 3, which is lined with the elastomeric material 21 which surrounds the end section of the support arm 3 arranged inside the housing 7.

A circle with a centrally located point in the coordinate system shown in FIG. 5 indicates that the positive orientation of the transverse direction Y of the vehicle extends out from the drawing plane.

The elastomeric suspension spring 5 has a segmented construction and has two separation surfaces 45, 47 abutting one another substantially over their entire surface. The two separation surfaces 45, 47 which extend in a plane spanned by the transverse direction Y of the vehicle and the vertical direction Z of the vehicle, constitute a separation disposed within the elastomeric support spring 5. The elastomeric support spring 5 has two segments 49, 51 which are connected to each other at one of their ends to form a common connecting web 53. The connecting web 53 forms in its longitudinal extension along the transverse direction Y of the vehicle a portion of an outer side of the elastomeric support spring 5.

Alternatively, the elastomeric suspension spring 5 may have more than two segments, for example, four segments of equal size, with the resulting separation surfaces likewise preferably also extending in the vertical direction Z of the vehicle.

The elastomeric suspension spring 5 may also be designed as a solid block spring without separation surfaces.

REFERENCE SYMBOLS 1 unit mount
3 support arm
5 elastomeric support spring
7 housing
9 first housing part
11 second housing part
13 fastening tab
15 first housing opening
17 passage area
19 weld joint
21 elastomeric material
23 contact surface
25 first bump stop
27 first stop face
29 sword-shaped tongue
31 groove
33 second housing opening
35 end section of the support arm 37 second bump stop
39 second stop face
41 third bump stop
43 third stop face
45 separating surface
47 separating surface
49 segment
51 segment
53 connecting web
X longitudinal direction of the vehicle
Y transverse direction of the vehicle
Z vertical direction of the vehicle

The invention claimed is:

1. A method for mounting a unit mount (1), comprising: a closed, housing (7) having a respective housing opening (15, 33) on each of two opposite sides, an elastomeric bearing spring (5) receivable in the housing (7), and a support arm (3) which is fixed inside the housing (7) and projects at least with one end from one of the two housing openings (15, 33), wherein the housing (7) has a sword-shaped tongue (29) which extends into the interior of the housing (7) and engages in a correspondingly shaped groove (31) of the support arm (3), the method comprising successive steps of:
forming the housing (7) in one piece or from several individual housing parts which are connected to one another before the unit mount (1) is assembled;
placing the support arm (3) into the housing (7) such that the sword-shaped tongue (29) engages in the correspondingly shaped groove (31) of the support arm (3);
inserting the elastomeric bearing spring (5) into the housing (7) after the support arm (3) has been installed in the housing (7) without having to force the support arm into the housing around the sword-shaped tongue against resistance of a compressed elastomeric support spring,
wherein the housing is oriented so that the sword-shaped tongue (29) has a folded edge that during assembly different portions thereof point in opposing directions.

2. The method according to claim 1, wherein the elastomeric bearing spring (5) is inserted into the housing (7) through a first (15) of the two housing openings (15, 33) after the support arm (3) has been installed in the housing (7), wherein the support arm (3) protrudes not at all or only slightly from the first housing opening (15), and wherein the support arm (3) is installed in the housing (7) through a second of the housing openings (33).

3. The method according to claim 2, wherein the elastomeric bearing spring (5) is pre-stressed in the assembled state.

4. The method according to claim 1, wherein the elastomeric bearing spring (5) is inserted into the housing (7) through a second (33) of the two housing openings (15, 33) after the support arm (3) has been installed in the housing (7) and with the support arm (3) protruding from the second housing opening (33).

5. The method according to claim 1, wherein the elastomeric bearing spring (5) is subdivided into a plurality of segments and has at least two separating surfaces (45, 47), wherein the at least two separating surfaces (45, 47) represent in an assembled state internal surfaces and not outer surfaces of the elastomeric support spring.

6. The method according to claim 5, wherein the at least two separating surfaces (45, 47) extend in a vertical direction (Z) of the vehicles.

7. The method according to claim 1, wherein the housing opening (15, 33) through which the elastomeric bearing spring (5) is inserted after the support arm (3) has been installed in the housing (7), is trapezoidal and becomes wider in the vertical direction (Z) of the vehicle.

8. The method according to claim 1, wherein the housing opening (15, 33) through which the elastomeric bearing spring (5) is inserted after the support arm (3) has been installed in the housing (7), is shaped as a segment of a circle that is open in the vertical direction (Z) of the vehicle and has rounded transitions.

9. The method according to claim 1, wherein the housing (7) is constructed of the several housing parts (9, 11) in mixed construction, with at least one housing part (9) formed from the group consisting of stamped sheet metal part, cast part and extruded part, and at least one other housing part (11) formed from a different part type of the same group.

10. The method according to claim 1, wherein the support arm (3) is inserted into the housing (7) such that the support arm (3) bears against a shape-matching region of an inner wall of the housing (7) by virtue of its own weight.

11. The method according to claim 1, wherein the unit mount (1) is installed in a motor vehicle.

12. The method according to claim 2, wherein the first housing opening (15) is designed in so that the elastomeric bearing spring (5) is insertable into the housing (7) through the first housing opening (15) with the support arm (3) already installed in the housing (7).

13. The method according to claim 10, wherein the support arm (3) after being inserted into the housing (7), thus bears with its own weight on the shape-matching region of the inner wall of the housing.

14. The method according to claim 1, wherein the elastomeric bearing spring (5) is pre-stressed in the assembled state.

15. The method according to claim 5, wherein in the assembled state, the at least two separating surfaces (45, 47) abut one another without a gap essentially over their entire surface.

16. The method according to claim 5, wherein each of the at least two separating surfaces form a corresponding separation defining a segmented support spring with two segments, with one separating surface being assigned to each of the two segments; the segments, having identical cross-sectional areas perpendicular to the separating surfaces, are connected to one another at one of their respective ends, forming a common connecting web; at respective opposite ends, the segments are spread apart from one another in their relaxed, non-installed state.

* * * * *